(12) United States Patent
Crawford et al.

(10) Patent No.: US 12,477,170 B2
(45) Date of Patent: Nov. 18, 2025

(54) ESTABLISHING NETWORK CONNECTIONS BETWEEN DEVICES CONNECTED BY A MEDIA CONNECTION

(71) Applicant: Promethean Inc., Alpharetta, GA (US)

(72) Inventors: Jason Crawford, Brewster, NY (US); Shom Surendran Ponoth, Irvine, CA (US); Rajkumar Chandrasekaran, San Ramon, CA (US); Inder Paul Bajwa, Tustin, CA (US); Parivallal Gopal, Karnataka (IN); Tamer Abuelsaad, Fishkill, NY (US); Mark Hall, Norwich (GB)

(73) Assignee: Promethean Inc., Alpharetta, GA (US)

( * ) Notice: Subject to any disclaimer, the term of this patent is extended or adjusted under 35 U.S.C. 154(b) by 70 days.

(21) Appl. No.: 18/202,586

(22) Filed: May 26, 2023

(65) Prior Publication Data
US 2023/0388575 A1    Nov. 30, 2023

(30) Foreign Application Priority Data

May 27, 2022 (IN) .............................. 202241030625

(51) Int. Cl.
*H04N 21/426* (2011.01)
*H04N 21/4363* (2011.01)

(52) U.S. Cl.
CPC . *H04N 21/42684* (2013.01); *H04N 21/43635* (2013.01); *H04N 21/43637* (2013.01)

(58) Field of Classification Search
CPC ....... H04N 21/42684; H04N 21/43635; H04N 21/43637
See application file for complete search history.

(56) References Cited

U.S. PATENT DOCUMENTS

| | | | |
|---|---|---|---|
| 8,973,024 B2 | 3/2015 | Kikkawa | |
| 9,942,605 B2 | 4/2018 | Lee et al. | |
| 11,356,636 B2 | 6/2022 | Aggarwal et al. | |
| 2012/0327250 A1* | 12/2012 | Zhang | G09G 5/006 348/180 |
| 2018/0063203 A1* | 3/2018 | Marella | H04L 65/403 |
| 2018/0192122 A1* | 7/2018 | Rajapakse | H04N 21/44227 |
| 2018/0315394 A1* | 11/2018 | Roberts | H04N 21/44231 |
| 2019/0230318 A1* | 7/2019 | Aggarwal | G09G 5/006 |
| 2020/0252584 A1* | 8/2020 | Hirano | H04N 7/12 |
| 2020/0296793 A1* | 9/2020 | Cheong | H04L 1/0009 |

* cited by examiner

*Primary Examiner* — Mulugeta Mengesha
(74) *Attorney, Agent, or Firm* — Thomas | Horstemeyer, LLP (57) ABSTRACT

A device management server computer ("server") has a media-only interface to a device and transmits a device identifier to the device over the interface, the device identifier having embedded network information sufficient to enable the device to establish a separate connection to the server over a communication link such as a wireless network. An application on the device retrieves the device identifier, extracts the network information, and uses the network information to establish the separate connection over the communication link. The device identifier can be part of an EDID provided over an HDMI interface. Instructions transmitted over the separate connection can be used to control transmission of media over the media-only interface.

21 Claims, 5 Drawing Sheets

ESTABLISHING NETWORK CONNECTIONS BETWEEN DEVICES CONNECTED BY A MEDIA CONNECTION

RELATED APPLICATION

This application claims priority under 35 U.S.C. 119(a)-(d) to Foreign Application No. 202241030625 entitled "ESTABLISHING NETWORK CONNECTIONS BETWEEN DEVICES CONNECTED BY A MEDIA CONNECTION" and filed in India on May 27, 2022, the contents of which are herein incorporated in their entirety by reference for all purposes.

FIELD OF THE DISCLOSURE

One technical field of the present disclosure is digital communication between computer devices. Another technical field is utilizing digital media interfaces to communicate computer network information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Media content comes in many forms and from many sources. In settings, such as a classroom, there can be many diverse devices present to create and output media content and otherwise communicate with one another. Some devices can use media connections, such as high-definition multimedia interface (HDMI), whereas others use a wired or wireless network, such as ethernet, wireless fidelity (Wi-Fi), BLUETOOTH, or other type of network.

DETAILED DESCRIPTION

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTER COMPONENTS
4. FUNCTIONAL DESCRIPTIONS
5. EXAMPLE PROCESSES
6. HARDWARE IMPLEMENTATION
7. EXTENSIONS AND ALTERNATIVES

1. General Overview

A device management server computer ("server") can be connected to a device of a plurality of input devices and output devices by means of a media-only connection. In some implementations, the media-only connection is only capable of transmitting media content or media metadata and is not capable of transmitting instructions or any other data. The media-only connection can be a one-to-one connection that does not require an exchange of authentication information according to a protocol prior to communication (e.g., pairing step) or sending of data to a specific address for communication. The server can benefit from having another communication link with the device in order to exchange additional data, such as instructions for managing display of media content transmitted over the media-only connection. The communication link can be over a multi-party medium accessible by multiple devices and which requires use of an address or pairing codes in order for devices to communicate with one another. The communication link can be over a wired or wireless (e.g., Wi-Fi) network implementing a network protocol. The communication link can be a BLUETOOTH connection requiring pairing of the device with the server in order to perform secure communication.

Network information for facilitating establishment of a connection over the communication link can be embedded in a device identifier sent to the device over the media-only connection. The device identifier can include fields defining parameters for outputting video and audio data and one or more fields that include network information. The device through an application executing on the device can then use the network information from the device identifier to establish the communication link.

The approach described herein enables a trusted communication channel to be created between devices that are already connected by a separate media-only connection. This is done using a reliable media-only connection. For example, a laptop connected to a public wireless network can use a media-only connection to establish a wireless connection to another device with assurance that the wireless connection is not to an unknown device, including a malicious actor. The media-only connection can also be used to automatically refresh network information for the communication link in order to further promote security. This approach can be implemented for a device with multiple media ports such that a separate communication link is uniquely associated with each of the media ports.

2. Example Computing Environments

Figure 1:
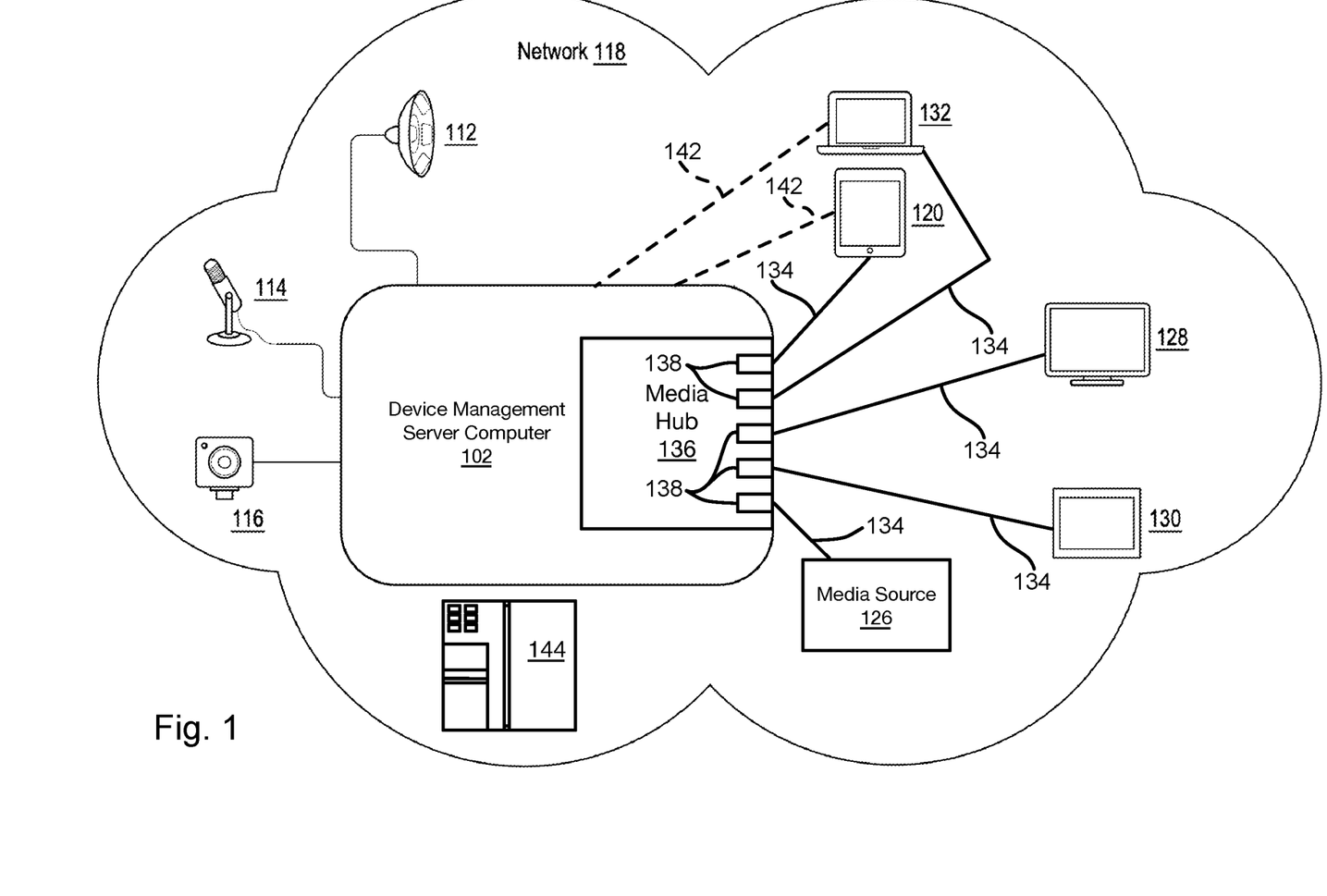
FIG. 1 illustrates an example networked computer system in which various embodiments can be practiced.

FIG. 1 illustrates an example networked computer system in which various embodiments can be practiced. FIG. 1 is shown in simplified, schematic format for purposes of illustrating a clear example and other embodiments can include more, fewer, or different elements.

A device management server computer 102 ("server 102") can be operatively coupled to one or more peripheral devices, such as a speaker 112, microphone 114, and camera 116. The server 102 can also cooperate with one or more computing devices 120, 132 that can be embodied as smart phones, tablet computers, laptop or desktop computers, wearable computing devices or other computing devices. The computing devices 120, 132 can display media content (e.g., audio and/or visual data) and provide media content to the server 102 for output on the speaker 112 or other display devices 128, 130 that can be embodied as computer monitors, touch screens, televisions including both display and audio output capabilities, digital picture frames, or other types of output devices. The server 102 can be connected to one or more media sources 126 that can include a radio or television receiver, media player (for CD, DVD, HD DVD, Blu-ray disc (BD), or other storage formats), or other source of media content.

The server 102 can connect to any of the above-referenced devices by a "media-only connection" 134. As used herein, a media-only connection 134 between two devices can be understood as a connection by means of a physical wire or wireless signals over an interface that is only capable of transmitting media content and related media metadata, such as parameters facilitating the output of the media content. For example, when the media data is video data, the media metadata could indicate the permissible image resolution. In some implementations, the media-only connection 134 has limited capacity, or no capacity, to communicate data that is not encoded in a media format for images, video, and/or audio data. For example, the limited capacity may require media metadata to be transmitted only in the first communication between two devices. The media-only connections 134 can be such that no device address or any other relevant information used to identify or locate a device is required for one-to-one communication of devices connected thereby. In some implementations, a media-only connection 134 is an essentially one-way connection from a source device to a destination device. The media-only connection 134 may allow media metadata to flow from the destination device to the source device but otherwise allow only media content to independently flow from the source device to the destination device. In some implementations, a communication protocol implemented over a media-only connection 134 relies on a physical connection in place of a handshaking step of a typical network protocol (e.g., back and forth exchange of information prior to exchanging payload data) or other connection setup steps such that media content be transmitted without delay over the media-only connection 134 upon being plugged in.

The media-only connections 134 can include, for example, HDMI connections implemented over physical HDMI cables or a wireless implementation of the HDMI standard. The media metadata can be an extended display identification data (EDID). In other implementations, the media-only connections 134 are established through one or more DISPLAYPORT, video graphics array (VGA), digital visual interface (DVI), or universal serial bus (USB)-C, ports. In some implementation, an HDMI connection may be implemented by means of an adapter (e.g., dongle) along with a cable according to the DISPLAYPORT, VGA, DVI, or USB standards. Media-only connections 134 can be implemented using infrared (IR) or radio frequency (RF) signals.

In the illustrated embodiment, the media-only connections 134 are connected to a media hub 136 of the server 102. The media hub 136 can include a plurality of ports 138. The ports 138 can include one or both of input ports and output ports. For example, the media hub 136 can implement an HDMI controller connected to all of the ports 138 or manage a plurality of HDMI controllers each corresponding to one of the plurality of ports 138. Where the ports 138 are embodied as HDMI ports, they can have the type A, C, or D or other form factors defined by the HDMI standard.

Using the approach described herein, devices connected to the server 102 by media-only connections 134 can additionally establish network connections 142 with the server 102. There can be multiple servers 102 in some embodiments. The approach described herein enables a device to establish a network connection to a specific server 102. The network connections 142 can be used to transfer instructions or other data that is not media content or media metadata and that is not transmissible over the media-only connections 134. In the examples discussed herein, the computing devices 120, 132 establish network connections 142 to the server 102. However, any of the devices shown that has an appropriate network interface can also establish network connections 142 in a like manner.

The network connections 142 can be implemented over a network 118 that can be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a wired or wireless Local Area Network (LAN), a Wide Area Network (WAN), the Internet, a terrestrial or satellite link, etc. The network 118 can implement a network protocol such as interne protocol (IP), user datagram protocol (UDP), transmission control protocol (TCP), or other network protocol. The network 118 can also be implemented as a BLUETOOTH network over which any number of devices can transmit data and for which pairing can be required in order for any pair of devices to perform one-to-one communication in an authenticated manner. In general, the network 118 is a medium or mechanism that requires data to be sent to a specific address of a particular recipient in order to communicate, or communicate securely, or that requires a pairing code to be communicated between devices for secure communication to occur in the case of a BLUETOOTH network. The network connections 142 can be established by means of IR or RF signals, such as Wi-Fi direct or other protocol.

In some of the approaches described herein, a configuration server 144 is in data communication with some or all of the server 102 and user computing devices 120, 132, such as by means of the network 118 or a different network. The configuration server 144 can facilitate establishment of network connections 142 between the server 102 as described in greater detail below.

In some embodiments, the server 102 broadly represents one or more computers, virtual computing instances, and/or instances of a server-based application that is programmed or configured with data structures and/or database records that are arranged to host or execute functions including but not limited to managing an input/output (I/O) system including some or all of the devices 112, 114, 116, 120, 126, 128, 130, 132. Managing the I/O system can include connecting or disconnecting the I/O devices to enable communication of data inputted by the input devices to be outputted by the output devices. In certain embodiments, the server 102 can comprise a controller that provides a hardware interface for one or more components in the I/O system. For example, the server 102 can have an audio controller that communicates with I/O devices that handle audio data or a camera controller that specifically communicates with the camera 116. The server 102 is generally located in a physical room with the I/O system to help achieve real-time response.

In some embodiments, the I/O system can comprise any number of input devices, output devices, or media hubs. An input device typically includes a sensor to receive data, such as a keyboard to receive tactile signals, a camera to receive visual signals, or a microphone to receive auditory signals. Generally, there can be a sensor to capture or measure any physical attribute of any portion of the physical room. Additional examples of a physical attribute include smell, temperature, or pressure. There can also be sensors to receive external signals, such as a navigation device to receive satellite GPS signals, a radio antenna to receive radio signals, or a set-top box to receive television signals. These sensors do not normally receive signals generated by a user but can still serve as media sources. An output device is used to produce data, such as a speaker to produce auditory signals, a monitor to produce visual signals, or a heater to produce heat. An integrated device integrates input features and output features and typically includes a camera, a microphone, a screen, and a speaker. Example of an integrated device include a desktop computer, laptop computer, tablet computer, smartphone, or wearable device. A media hub typically comprises a plurality of ports into which media devices can be plugged. The media hub is configured to then re-direct data communicated by media sources to output channels, thus "turning on" or "activating" connections with specific output devices in accordance with instructions from the server 102. In general, one or more of the input devices can be selected to capture participant actions in addition to or instead of other activities in the physical room. The selected input devices can be dedicated to such use or can concurrently capture other activities in the physical room. For example, the microphone 114 capturing spoken words from a participant can be connected with a speaker to broadcast the spoken words, and the microphone can also capture other sounds made in the physical room.

The server 102 can serve as an intermediary media source to the media hub 136 by converting data received from certain input devices to a format compatible with the communication interface supported by the media hub 136. The media devices 128 and 130 communicating with the media hub 136 can include a digital audio device or a video projector, which can be similar to other output devices but being specifically compatible with the communication interface supported by the media hub 136. The server 102 and the components of the I/O system can be specifically arranged in the physical room to maximize the communication efficiency and overall performance.

Figure 2:
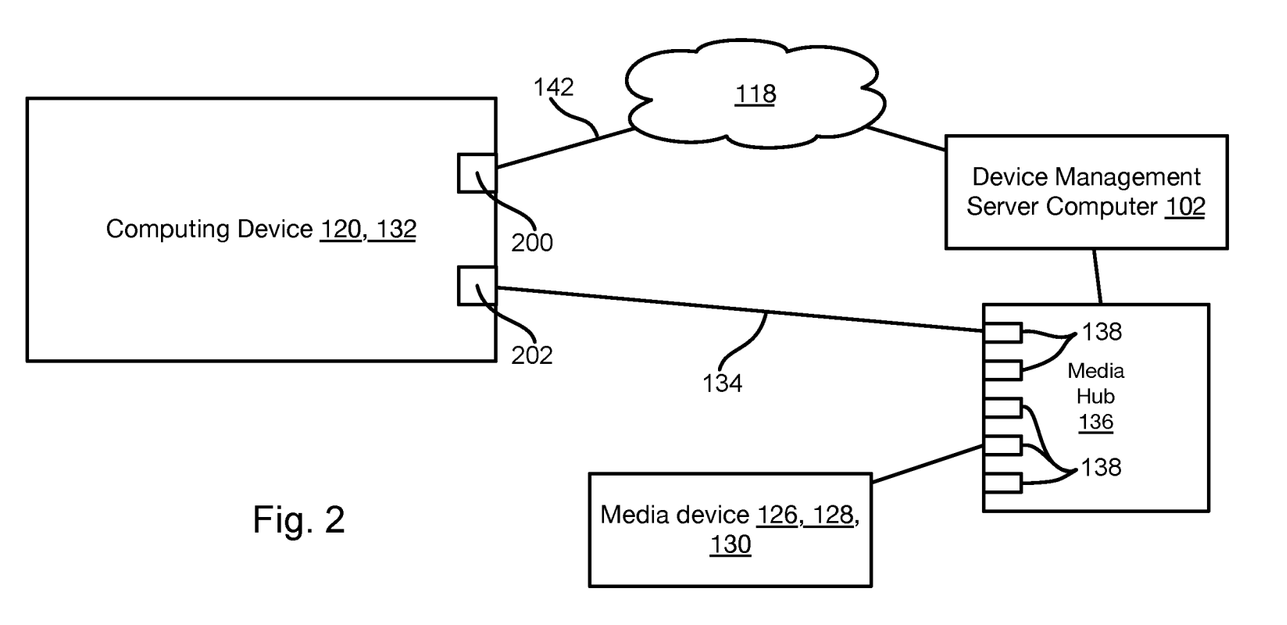
FIG. 2 further illustrates within the example networked computer system communication between a computing device and a device management server computer to establish a network connection in accordance with the disclosed embodiments.

FIG. 2 illustrates components of a computing device 120, 132 that can be used to set up a network connection 142 using the limited capabilities of an existing media-only connection 134. The computing device 120, 132 can include interfaces such as a network interface 200 embodied as some or all of a network adapter, BLUETOOTH transceiver, Wi-Fi transceiver, or other hardware component for connecting to the network 118 and establishing a network connection 142 over the network 118. The computing device 120, 132 can include one or more ports 202 for connecting to media-only connections 134. For example, the one or more ports 202 can include an HDMI port, or another type of port for connecting to an audio device, display device, or another type of media input or output device. In the illustrated embodiment, at least one port 202 is connected to one of the ports 138 of the media hub 136 by one of the media-only connections 134. The port 202 and ports 138 of the media hub 136 can be implemented using the HDMI or another media connection standards.

3. Example Computer Components

In some embodiments, the computing device 120, 132 coupled to a media source device can be programmed to execute various components which can comprise computer-executable instructions. A first component can be a media-only connection interface module that manages a media-only connection, including obtaining media output information from a media-only connection or transmitting media content to the server 102 (or the media hub 136) via the media-only connection according to the media output information. A second component can be a network connection management module that facilitates establishing a network connection, including storing a format of network information, extracting network information in the expected format from data received via a media-only connection, or establishing a network connection with the server 102 using the network information.

In some embodiments, the server 102 can be programmed to execute various components which can comprise computer-executable instructions. A first component can be a media metadata management module that manages media metadata and network information, including storing a format of network information, receiving media metadata from each media output (sink) device connected to an output port (directly or indirectly of the server 102), and modifying the media metadata with the network information to enable media input (source) devices to establish network connections. A second component can be a media data management interface that manages transmission of media data, including receiving media data from a media source device connected to an input port (directly or indirectly of the server 102) and transmitting the media data or a variant thereof to an appropriate media sink device.

4. Functional Descriptions

Figure 3A:
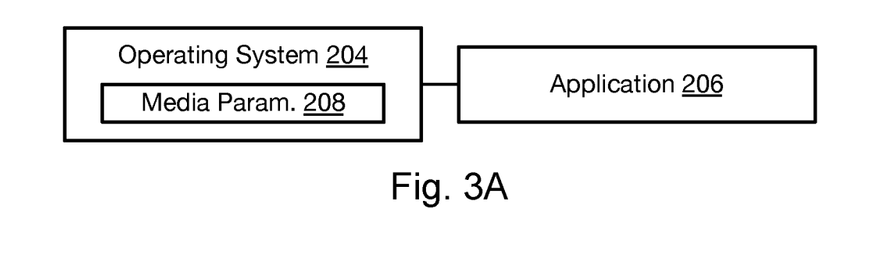
FIG. 3A illustrates example computer components of a computing device for facilitating establishing a network connection.

Referring to FIG. 3A, each computing device 120, 132 can execute an operating system 204. The operating system 204 can provide an interface for accessing hardware components integrated in or coupled to the computing device 120, 132 and provide application programming interfaces (API), libraries, system functions, and other software that can be used by an application 206 (as discussed in the previous section) to use hardware components of the computing device 120, 132. For example, the operating system 204 can be a WINDOWS, LINUX, UNIX, MACOS, IOS, CHROME OS, ANDROID, or another operating system.

When the computing devices 120, 132 act as a media source, the operating system 204 can receive and store media parameters 208 received over the media-only connection 134. The media parameters 208 can be parameters describing a device at the other end of the media-only connection 134, such as audio playback or video display parameters of the device. In the illustrated embodiment, the media parameters 208 are provided by the server 102.

Where the media-only connection 134 is an HDMI connection, the media parameters 208 can be implemented as values provided in the fields of an EDID according to the HDMI standard. The EDID standard defines a plurality of fields, such as hexadecimal fields, that are used to identify a device referenced thereby and include extended data describing the configuration and/or capabilities of the device referenced thereby (e.g., resolution or range of resolutions, refresh rate, color gamut, etc.). The EDID can refer to any version in the EDID development, including the more recent E-EDID and DisplayID. Any media-only connection standard that makes use of a device identifier may have that device identifier modified in the same manner as the EDID as described herein.

The EDID format 1.4, for example, allocates a number of bytes for use by a manufacturer (hereinafter "manufacturer fields") to identify the device. For example, bytes can be allocated for a manufacturer identifier (bytes 8-9 in EDID version 1.4), product code (bytes serial number (bytes 12-15), and date of manufacture (bytes 16-17). In some implementations, the manufacturer fields are not used to control the output of media content transmitted over an HDMI connection and can be arbitrarily configured by the manufacturer without affecting the output of the media content. In some embodiments, the server 102 can embed network information in the manufacturer fields in accordance with a predetermined embedding or modification format. The server 102 can embed additional information in the EDID that can be used after a network connection with the server 102 is established, such as a code or password specific to a computer application managing a media sink device connected to the server 102, a device name (e.g., "Kitchen TV"), or other information. The examples below are described with reference to the manufacturer fields. However, other byte positions of an EDID that are currently not assigned a function in the EDID standard or that are not needed to configure playback of media content sent to or received from a given device can be used in a like manner.

The operating system 204 can receive and store the EDID as the media parameters 208 and can use unmodified fields of the EDID to configure media content transmitted out of the port 202 or received over the port 202.

The application 206 can retrieve the EDID from the operating system 204, extract the embedded network information from the manufacturer field according to the predetermined modification format, and use the network information to establish a network connection 142 to the server 102 or the additional information to perform further activities. The application 206 can be installed prior to or after receiving the network information.

The media hub 136 is not itself a speaker or display device in some embodiments. Accordingly, other fields of the EDID can be left blank, filled with generic values, or filled with data describing another device 120, 132, 128, 130, 126 that is connected to the media hub 136, such as any of these devices 120, 132 (when 120 and 132 acting as media sources), 128, and 130, that has been selected to receive media content from the computing device 120, 132. For example, an EDID received from any of media output devices can be modified to insert the network information in the manufacturer fields thereof and the modified EDID can be used as described herein. For example, a device connected to an output port of the ports 138 can provide an EDID that is then modified by the server 102 to include network information and transmitted over an input port of the ports 138 to a computing device 120, 132 according to the approaches described herein.

In some embodiments, the media hub 136 is connected to one media output device via an output port and one or more media input devices via one or more input ports using media-only connections at some point. Once the media output device is connected, the media hub 136 and the server 102 can receive the EDID for the media output device. The server 102 can then modify the EDID as discussed above immediately or within a predetermined period of time, so that a media input device that is connected typically at a later point can receive the modified EDID instead of the unmodified EDID and can further establish a network connection with the server 102. The server 102 can also send the modified EDID to a media input device through a media-only connection that's already established at the time the media output device is connected due to a programmatic trigger, for example. In other embodiments, the media hub 136 is connected to multiple media output devices via multiple output ports. A similar process could be performed in regard to each of the media output devices. The same network information related to the server 102 can be embedded into one or more of these EDIDs according to the predetermined modification format. Additional information specific to each media output device can be embedded into only the corresponding EDID.

Figure 3B:
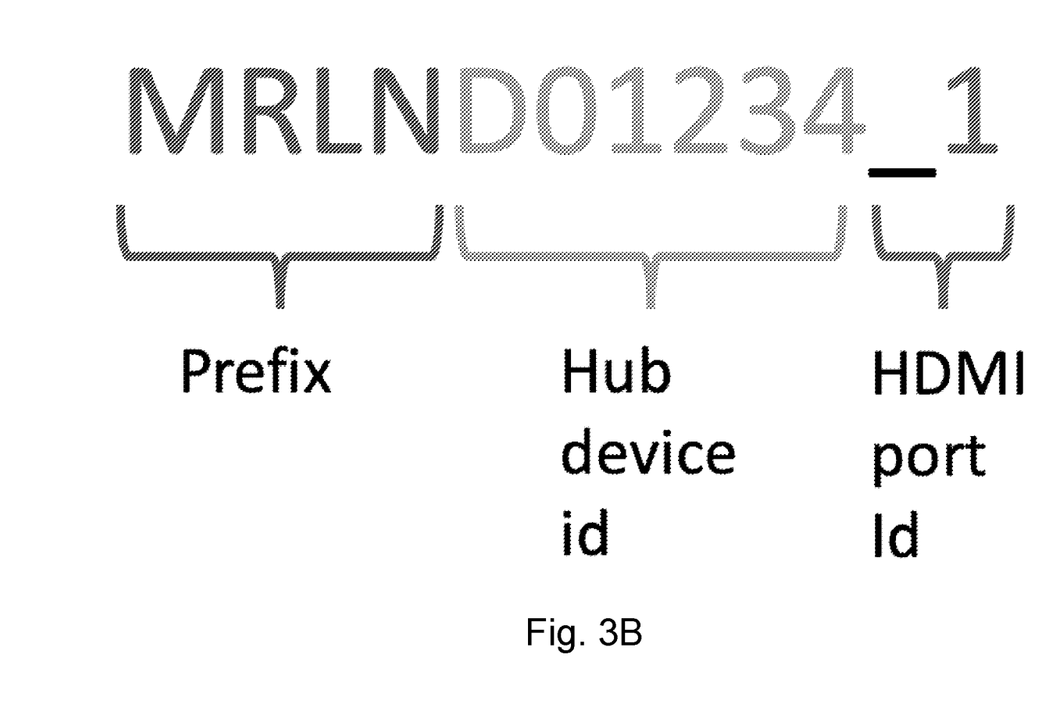
FIG. 3B illustrates example information that can be included in a device identifier in accordance with the disclosed embodiments.

Referring to FIG. 3B, the manufacturer field can be generated or modified by the server 102 to convey network information. For example, the manufacturer field can include a prefix, hub device identifier, and HDMI port number as the network information. The prefix can be a unique value indicating that the manufacturer field stores network information. In some embodiments, the prefix is selected to be a portion of the bits of the media access code (MAC) address of the server 102 or media hub 136 that are unique to each device manufacturer and are included in each MAC address of that device manufacturer. For example, the first (most significant) four to six bits of the MAC address can be used as the prefix. In the case where the device 120, 132 has multiple output ports among the ports 202, the prefix can be used to quickly distinguish between the server 102 (together with a media output device connected to the server 102) and other media output devices that do not embed network information according to the approach described herein.

The hub device identifier can include the MAC address of the server 102 (or the remaining bits following those used as the prefix), IP address of the server 102, BLUETOOTH pairing code, or an arbitrary code that can be used to uniquely identify the server 102 or a network path to the server 102.

The media hub 136 can include multiple input ports in ports 138 and it can be helpful for the server 102 to associate a network connection 142 to the computing device 120, 132 with an identifier (e.g., HDMI port number) of a port 138 to which the computing device 120, 132 is also connected. The association between an input port number and a network connection can be used by the server 102 to relate data (e.g., instructions) received over the network connection 142, which can reference the input port number, with playback of media content transmitted over a media-only connection 134 corresponding to that port number. Accordingly, the HDMI port number field can be populated with an identifier of this port 138. In other embodiments, mapping to a particular port 138 is handled differently. For example, the embedded network information in the media parameters 208 transmitted over each port 138 can be unique relative to other ports 138. Upon receiving a request for a network connection 142 including the embedded network information, the server 102 can associate network connections 142 to the particular port 138 associated with the embedded network information.

Figure 4A:
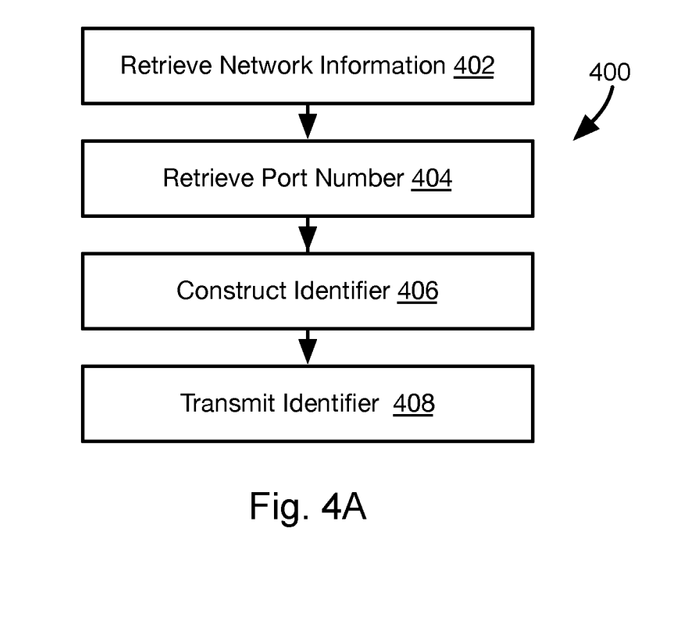
FIG. 4A illustrates an example process for providing network information over a media connection using a device identifier in accordance with the disclosed embodiments.

Referring to FIG. 4A, the illustrated method 400 can be executed by the server 102 or a component thereof (e.g., the media hub 136) in order to provide network information to a computing device 120, 132 connected to a port 138 by a media-only connection 134. The method 400 can be executed each time a computing device 120, 132 connects to a port 138 of the media hub 136 and can also be executed periodically, as discussed above, such as to establish a new network connection 142 to enhance security.

The method 400 can include an initial step of obtaining, from a user or a storage device, the modification format that specifies how the fields of the media metadata, such as the EDID, is to be modified and interpreted. Next, the method 400 can include retrieving 402 network information. The network information can include a MAC address of the server 102, IP address of the server 102 for the network 118, a network path to the server 102, a BLUETOOTH pairing code, or other information such as a password for authentication. In implementations in which a configuration server 144 is used to facilitate establishing the network connection 142, the network information can include a unique identifier of the server 102 or a network path to the server 102. Such implementations can be useful when the information required to reach the server 102 is dynamically determined or is not easily fit into one of the modifiable fields of the media metadata. The unique identifier can then be used as an index to look up an address of the server 102, network path to the server 102, or other information that can be used to establish a network connection with the server 102. The network information can further include an address of the configuration server 144 (MAC, IP, etc.). The method 400 can further include retrieving 404 the port number of the port 138.

The method 400 can include constructing 406 a device identifier. Constructing 406 a device identifier can include generating a device identifier including the network information and port number. Constructing 406 a device identifier can including modifying an existing device identifier to include the network information and port number. For example, the EDID received from another device can be modified to replace at least a part of the manufacturer fields with the network information and port number. Constructing 406 the device identifier can include adding a prefix, the prefix indicating that the device identifier includes embedded information. In some embodiments, the prefix is a portion of an address, e.g., MAC address of the server 102. In some embodiments, the prefix is some other arbitrary predefined value.

The device identifier as constructed at step 406 can then be transmitted 408 over the media-only connection 134 to the device 120, 132. Where the media-only connection is an HDMI connection, the device identifier can be transmitted as an EDID over the HDMI connection and in accordance with the HDMI standard implemented by the media hub 136.

Figure 4B:
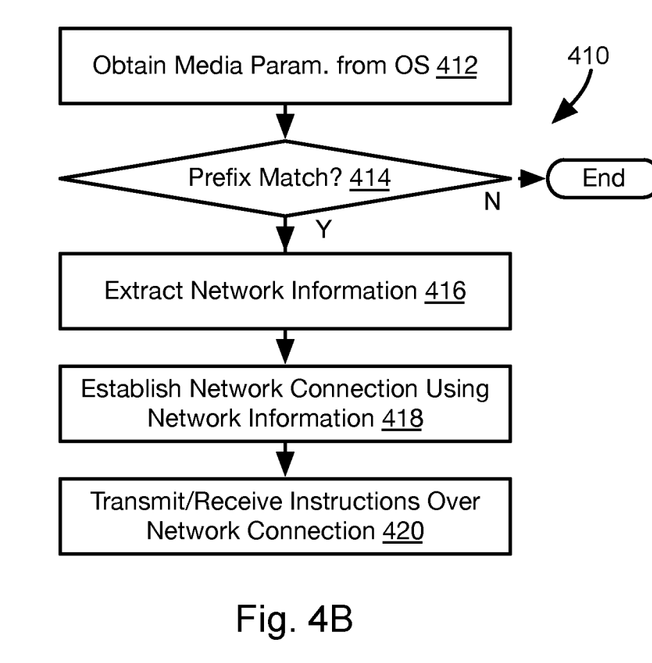
FIG. 4B illustrates an example process for establishing a network connection using network information provided over a media connection in accordance with the disclosed embodiments.

FIG. 4B illustrates a method 410 that can be executed by a computing device 120, 132 on order to establish a network connection 142 using network information provided according to the method 400. The method 410 can be executed by the application 206 executing on the computing device 120, 132 or some other software or hardware component of the computing device 120, 132. The method 400 can include an initial step of obtaining, from a user or a storage device, the modification format that specifies how the fields of the media metadata, such as the EDID, is to be modified and interpreted. Next, the method 410 can include obtaining 412 the media parameters 208 from the operating system 204, e.g., an EDID received from the server 102.

The method 400 can include evaluating 414 a prefix of the media parameters 208, which can be part of actual network information or form a separate field. If the prefix is found to match a predefined value (e.g., a portion of a MAC corresponding to a specific manufacturer of the server 102), the method 410 can include extracting 416 network information from the media parameters 208 and establishing 418 a network connection 142 using the extracted network information. If not, the method 400 can end such that a network connection 142 is not established using extracted network information.

Where the network information is a network address (e.g., MAC or IP address), establishing 418 a network connection can include transmitting one or more packets over the network 118 with the destination address of the one or packets being the network address included in the network information. For example, the one or more packets can be part of a handshaking procedure according to a network protocol such as IP, UDP, or TCP.

In some embodiments, the network information is an identifier of a static network path sufficient to enable the computing device 120, 132 to connect to the server 102. The network path can have been previously loaded onto the computing device 120, 132 as part of a configuration file independent of the network information received over the media-only connection 134. The network path can be retrieved from the configuration server 144 in response to a request transmitted to the configuration server 144, the request including the identifier of the network path.

In some embodiments, the network information is a BLUETOOTH pairing code. For example, the network information can be of the form BTXXXX, where BT (or some other code) indicates that the network information is a BLUETOOTH pairing code and XXXX is the pairing code. Establishing 418 a network connection can include transmitting the BLUETOOTH pairing code from a BLUETOOTH transceiver of the computing device 120, 132. The server 102 can receive the transmitted pairing code and, in response, establish a BLUETOOTH connection with the computing device 120, 132.

In some embodiments, the network information is information to facilitate establishment of a network connection 142 by way of the configuration server 144. Establishing 418 a network connection can therefore include transmitting the network information or a portion thereof to the configuration server 144. In response to receiving the network information, the configuration server 144 can respond back with additional information enabling the computing device 120, 132 to establish a network connection 142 to the server 102. For example, the network information can include a unique identifier of the server 102. The server 102 can register with the configuration server 144 and provide a network address (e.g., MAC or IP) to the configuration server 144 along with a unique identifier of the server 102. Upon receiving the same unique identifier from the computing device 120, 132, the configuration server 144 can return the network address to the computing device 120, 132.

With both a media-only connection 134 and a network connection 142, the computing device 120, 132 and server 102 can implement various functions by transmitting or receiving instructions over the network connection 142 and transmitting or receiving media content over the media-only connection 134. Below are a number of non-limiting, example uses for the connections 134, 142.

In a first example where another device wants to control the output of media content from a media source, the computing device 120, 132 provides media content to the media hub 136 over the media-only connection 134. The media hub 136 can then transmit the media content to a display device 128, speaker 112, or other output device. A user speaks a voice command (or provides a command by way of a remote controller or other interface element of the server 102 or output device) to alter playback of the media content (pause, rewind, fast forward, adjust volume, etc.) that is detected by the server 102 by means of the microphone 114. In response, the server 102 transmits an instruction to the computing device 120, 132 over the network connection 142 that instructs the computing device 120, 132 to implement an action corresponding to the command. In response, the computing device 120, 132 implements the action to alter playback of the media content over the media-only connection 134.

In a second example, the media hub 136 can modify the EDID of a display device 130 connected to the media hub 136 to embed its relevant network information in the EDID and provide the modified EDID to be received by the computing device 120 over a first media-only connection 134. The computing device 120 can then establish a network connection 142 with the media hub 136 using the relevant network information using the approach described herein. The computing device 120 can then use the network connection 142 to send commands to the media hub 136 to control operation of the display device 130 (volume, picture, start, pause, rewind, and/or fast forward of media content, etc.). The computing device 120 can also simultaneously function as a media sink displaying media content received from the media hub 136 on a monitor of the computing device 120. Media content transmitted to the computing device 120 as a media sink can be received from the media hub 136 over a second media-only connection 134 different from the first media-only connection.

In a third example where a media sink would like to control the output of media content from a media source that is currently outputted to the media sink, the computing device 120 acting as a media sink could establish a first network connection 142 with the server 102, as described in the previous paragraph, or using another approach, such as through a wireless network. An input port of the media hub 136 is connected to a media source (e.g., another computing device 132, media source 126, microphone 114, camera 116, or other source) to which the server 102 is connected by a second network connection 142. The computing device 120 can then transmit a command over the first network connection 142 to alter playback of media content on the media source (play, pause, fast forward, rewind, switch to different media content, etc.). The command can simply refer to the media content currently outputted to the media output device coupled with the computing device 120.

In some embodiments, the server 102 already has knowledge of the input port associated with the media source that is producing media content being outputted at the computing device 120, as discussed herein. Upon receiving the command, the server 102 thus retrieves the second port number and identifies the corresponding second network connection 142. The server 102 can then send the command over the second network connection to the media source which can then alter the playback of the media content according to the command.

In a fourth example, a command is received by a media source 126. The command can be for the server 102 to control the media output by the media source 126 at an additional or advanced level compared to what can be achieved by the media source 126 directly.

In a fifth example, a command received by a media source has nothing to do with media content but rather is a command for the server 102 to control any other aspect of the network environment (see FIG. 1).

In a sixth example, a media source can communicate with the server via a network connection in a back-and-forth manner lacking with an HDMI-like connection. For example, there may be a request from a media source (e.g., media source 126) and a response to the request from the server 102.

6. Hardware Implementation

According to one embodiment, the techniques described herein are implemented by at least one computing device. The techniques can be implemented in whole or in part using a combination of at least one server computer and/or other computing devices that are coupled using a network, such as a packet data network. The computing devices can be hard-wired to perform the techniques, or can include digital electronic devices such as at least one application-specific integrated circuit (ASIC) or field programmable gate array (FPGA) that is persistently programmed to perform the techniques, or can include at least one general purpose hardware processor programmed to perform the techniques pursuant to program instructions in firmware, memory, other storage, or a combination. Such computing devices can also combine custom hard-wired logic, ASICs, or FPGAs with custom programming to accomplish the described techniques. The computing devices can be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
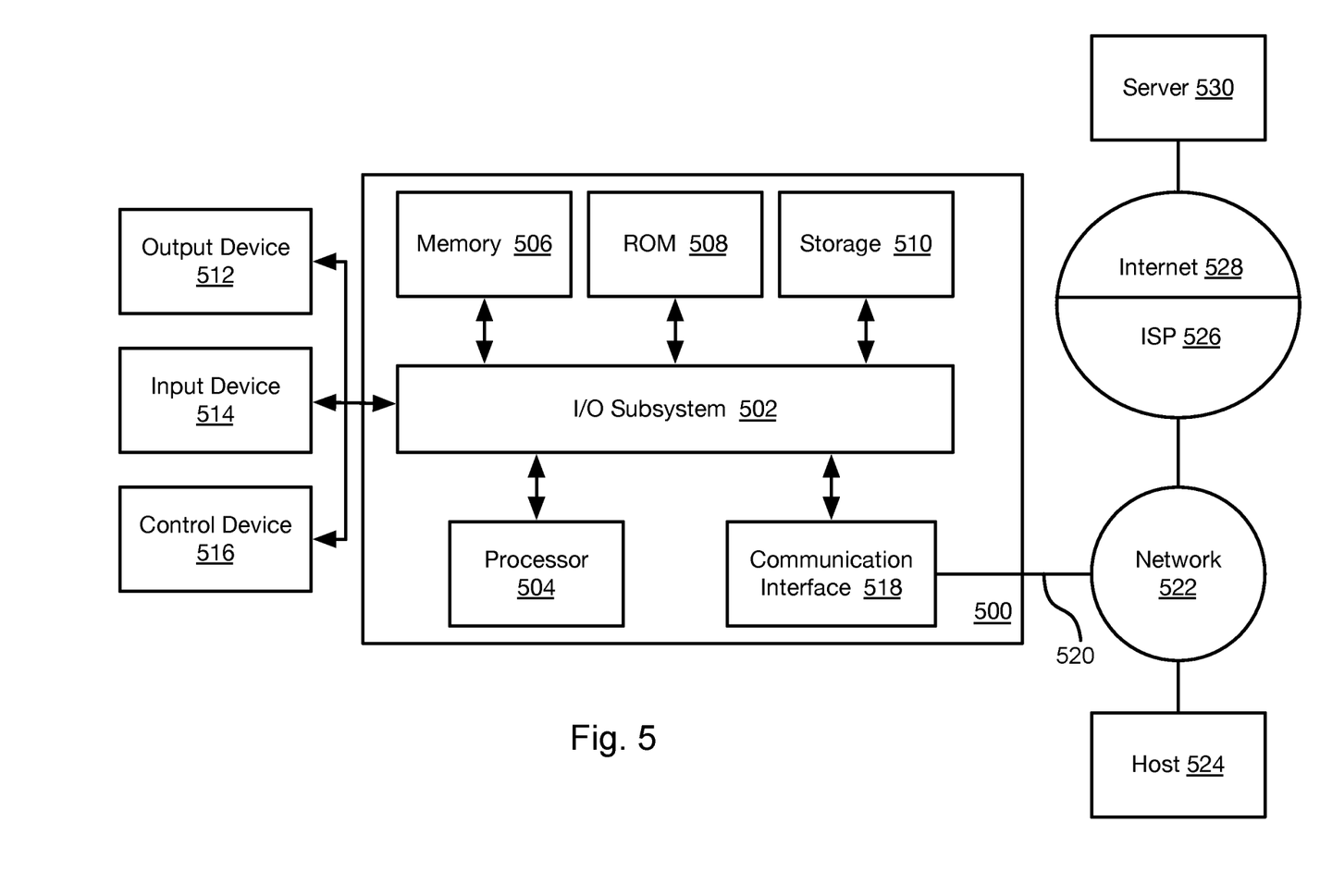
FIG. 5 is a block diagram that illustrates a computer system upon which an embodiment of the invention can be implemented.

FIG. 5 is a block diagram that illustrates an example computer system with which an embodiment can be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which can include a bus and/or other communication mechanism(s) for communicating information and/or instructions between the components of the computer system 500 over electronic signal paths. The I/O subsystem 502 can include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 can include, for example, a general-purpose microprocessor or microcontroller and/or a special-purpose microprocessor such as an embedded system or a graphics processing unit (GPU) or a digital signal processor or ARM processor. Processor 504 can comprise an integrated arithmetic logic unit (ALU) or can be coupled to a separate ALU.

Computer system 500 includes one or more units of memory 506, such as a main memory, which is coupled to I/O subsystem 502 for electronically digitally storing data and instructions to be executed by processor 504. Memory 506 can include volatile memory such as various forms of random-access memory (RAM) or other dynamic storage device. Memory 506 also can be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 can include various forms of programmable ROM (PROM) such as erasable PROM (EPROM) or electrically erasable PROM (EEPROM). A unit of persistent storage 510 can include various forms of non-volatile RAM (NVRAM), such as FLASH memory, or solid-state storage, magnetic disk or optical disk such as CD-ROM or DVD-ROM, and can be coupled to I/O subsystem 502 for storing information and instructions. Storage 510 is an example of a non-transitory computer-readable medium that can be used to store instructions and data which when executed by the processor 504 cause performing computer-implemented methods to execute the techniques herein.

The instructions in memory 506, ROM 508 or storage 510 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions can implement a web server, web application server or web client. The instructions can be organized as a presentation layer, application layer and data storage layer such as a relational database system using structured query language (SQL) or no SQL, an object store, a graph database, a flat file system or other data storage.

Computer system 500 can be coupled via I/O subsystem 502 to at least one output device 512. In one embodiment, output device 512 is a digital computer display. Examples of a display that can be used in various embodiments include a touch screen display or a light-emitting diode (LED) display or a liquid crystal display (LCD) or an e-paper display. Computer system 500 can include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which can perform cursor control or other automated control functions such as navigation in a graphical interface on a display screen, alternatively or in addition to input functions. Control device 516 can be a touchpad, a mouse, a trackball, or cursor direction keys for communicating direction information and command selections to processor 504 and for controlling cursor movement on display 512. The input device can have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 can include a combination of multiple different input devices, such as a video camera and a depth sensor.

In another embodiment, computer system 500 can comprise an internet of things (IoT) device in which one or more of the output device 512, input device 514, and control device 516 are omitted. Or, in such an embodiment, the input device 514 can comprise one or more cameras, motion detectors, thermometers, microphones, seismic detectors, other sensors or detectors, measurement devices or encoders and the output device 512 can comprise a special-purpose display such as a single-line LED or LCD display, one or more indicators, a display panel, a meter, a valve, a solenoid, an actuator or a servo.

When computer system 500 is a mobile computing device, input device 514 can comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 can include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 can implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions can be read into main memory 506 from another storage medium, such as storage 510. Execution of the sequences of instructions contained in main memory 506 causes processor 504 to perform the process steps described herein. In alternative embodiments, hard-wired circuitry can be used in place of or in combination with software instructions.

The term "storage media" as used herein refers to any non-transitory media that store data and/or instructions that cause a machine to operation in a specific fashion. Such storage media can comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but can be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media can be involved in carrying at least one sequence of at least one instruction to processor 504 for execution. For example, the instructions can initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 can optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 can be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 can comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 can provide a connection through a network 522 to a host computer 524.

Furthermore, network link 520 can provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 can be coupled to internet 528. Server 530 broadly represents any computer, data center, virtual machine or virtual computing instance with or without a hypervisor, or computer executing a containerized program system such as DOCKER or KUBERNETES. Server 530 can represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 can form elements of a distributed computing system that includes other computers, a processing cluster, server farm or other organization of computers that cooperate to perform tasks or execute applications or services. Server 530 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 can comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code can be executed by processor 504 as it is received, and/or stored in storage 510, or other non-volatile storage for later execution.

The execution of instructions as described in this section can implement a process in the form of an instance of a computer program that is being executed, and consisting of program code and its current activity. Depending on the operating system (OS), a process can be made up of multiple threads of execution that execute instructions concurrently. In this context, a computer program is a passive collection of instructions, while a process can be the actual execution of those instructions. Several processes can be associated with the same program; for example, opening up several instances of the same program often means more than one process is being executed. Multitasking can be implemented to allow multiple processes to share processor 504. While each processor 504 or core of the processor executes a single task at a time, computer system 500 can be programmed to implement multitasking to allow each processor to switch between tasks that are being executed without having to wait for each task to finish. In an embodiment, switches can be performed when tasks perform input/output operations, when a task indicates that it can be switched, or on hardware interrupts. Time-sharing can be implemented to allow fast response for interactive user applications by rapidly performing context switches to provide the appearance of concurrent execution of multiple processes simultaneously. In an embodiment, for security and reliability, an operating system can prevent direct communication between independent processes, providing strictly mediated and controlled inter-process communication functionality.

7.0. Extensions and Alternatives

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction

What is claimed is:

1. A computer-implemented method, comprising:
    generating, by a processor of a first device, a device identifier that enables establishing a network connection to the first device through a communication link, comprising modifying an extended display identification data (EDID) of a high-definition multimedia interface HDMI interface with network information;
    transmitting, by the processor, the device identifier to a second device through a media-only interface separate from the communication link,
    the media-only interface comprising the HDMI interface as a one-to-one connection such that transmission from the second device to the first device is limited to audio and video content; and
    establishing a network connection separate from the one-to-one connection with the second device through the communication link, the network connection initiated by the second device using the device identifier.

2. The computer-implemented method of claim 1, wherein the media-only interface is a physical cable.

3. The computer-implemented method of claim 1, wherein:
    the EDID includes a plurality of fields;
    modifying the EDID comprises inserting the network information into one or more first fields of the plurality of fields; and
    the plurality of fields includes one or more second fields including one or more audio and video display parameters.

4. The computer-implemented method of claim 1, wherein the communication link is an internet protocol (IP) network, a wireless fidelity (Wi-Fi) network, or a BLUETOOTH network.

5. The computer-implemented method of claim 1, wherein the device identifier includes a media access control (MAC) address of the first device.

6. The computer-implemented method of claim 1, wherein the device identifier includes a prefix indicating that the device identifier includes network information enabling establishment of the network connection.

7. The computer-implemented method of claim 6, wherein the prefix includes a portion of a media access control (MAC) address of the first device.

8. The computer-implemented method of claim 1, further comprising:
    receiving, by the processor, media content over the media-only interface; and
    outputting, by the processor, the media content on an output device coupled to the first device.

9. The computer-implemented method of claim 8, further comprising:
    receiving, by the processor, an output device identifier from the output device; and
    adding, by the processor, network information to the output device identifier to obtain the device identifier, the network information enabling establishing the network connection to the first device through the communication link.

10. The computer-implemented method of claim 8, further comprising:
    receiving, by the processor, instructions over the communication link from the second device; and
    controlling, by the processor, output of the media content on the output device according to the instructions.

11. The computer-implemented method of claim 1, wherein the device identifier is a first device identifier and the media-only interface includes a first port of the first device, the computer-implemented method further comprising:
    transmitting a second device identifier that is different from the first device identifier over a second media-only interface connected to a second port of the first device.

12. One or more non-transitory storage media storing instructions which, when executed by one or more computing devices, cause performance of a method comprising:
    obtaining a device identifier of an external device connected to a processor by a media-only connection to the external device, the media-only connection being a one-to-one connection such that transmission to the external device is limited to audio and video content;
    extracting network information from the device identifier; and
    communicating the network information to the external device and receiving, from the external device, information to establish a network connection to the external device over a network that is separate from the media-only connection.

13. The one or more non-transitory storage media of claim 12, wherein the media-only connection is a HDMI cable and the device identifier is a modified EDID.

14. The one or more non-transitory storage media of claim 12, wherein the network is one of a Wi-Fi network and a BLUETOOTH network.

15. The one or more non-transitory storage media of claim 12, wherein the network information is a MAC address of the external device.

16. The one or more non-transitory storage media of claim 12, wherein the instructions when executed further cause the processor to perform:
    evaluating a prefix of the device identifier; and
    extracting the network information from the device identifier in response to the prefix indicating that the device identifier includes the network information.

17. The one or more non-transitory storage media of claim 12, wherein the instructions when executed further cause the processor to perform:

obtaining, by an application executed by the processor, the device identifier from an operating system executed by the processor.

18. The one or more non-transitory storage media of claim 12, wherein the instructions when executed further cause the processor to perform:
transmitting media to the external device over the media-only connection; and
transmitting commands controlling display of the media to the external device over the network.

19. One or more non-transitory storage media storing instructions which, when executed, cause one or more processors of a first device to perform:
generating a device identifier that enables establishing a network connection to the first device through a communication link, comprising modifying an extended display identification data (EDID) of a high-definition multimedia interface HDMI interface with network information;
transmitting the device identifier to a second device through a media-only interface separate from the communication link,
the media-only interface comprising the HDMI interface as a one-to-one connection such that transmission from the second device to the first device is limited to audio and video content; and
establishing a network connection separate from the one-to-one connection with the second device through the communication link, the network connection initiated by the second device using the device identifier.

20. The one or more non-transitory storage media of claim 19, wherein the device identifier includes a prefix indicating that the device identifier includes network information enabling establishment of the network connection.

21. The one or more non-transitory storage media of claim 19, the instructions when executed causing the one or more processors to further perform:
receiving media content over the media-only interface; and
outputting the media content on an output device coupled to the first device.

* * * * *